United States Patent
Yang et al.

(10) Patent No.: US 12,277,618 B2
(45) Date of Patent: Apr. 15, 2025

(54) SYSTEM FOR RECOMMENDING DATA BASED ON SIMILARITY AND METHOD THEREOF

(71) Applicant: WISENUT, INC., Seongnam-si (KR)

(72) Inventors: Jae Seok Yang, Yongin-si (KR); Byung Su Lim, Seongnam-si (KR); Ha Young Kim, Seoul (KR); Ki Woong Nam, Yongin-si (KR)

(73) Assignee: WISENUT, INC., Seongnam-si (KR)

( * ) Notice: Subject to any disclaimer, the term of this patent is extended or adjusted under 35 U.S.C. 154(b) by 334 days.

(21) Appl. No.: 17/815,439

(22) Filed: Jul. 27, 2022

(65) Prior Publication Data

US 2023/0041615 A1 Feb. 9, 2023

(30) Foreign Application Priority Data

Aug. 5, 2021 (KR) .................. 10-2021-0103056

(51) Int. Cl.
*G06F 16/30* (2019.01)
*G06F 16/334* (2025.01)
(Continued)

(52) U.S. Cl.
CPC ....... *G06Q 50/265* (2013.01); *G06F 16/3344* (2019.01); *G06F 16/35* (2019.01); *G06F 16/383* (2019.01); *G06F 40/30* (2020.01)

(58) Field of Classification Search
CPC .... G06F 16/3344; G06F 16/35; G06F 16/383; G06F 40/30; G06N 20/10; G06N 3/09; G06Q 50/265

See application file for complete search history.

(56) References Cited

U.S. PATENT DOCUMENTS 10,867,212 B2 * 12/2020 Kwatra ................ G06F 18/214
2004/0205473 A1 * 10/2004 Fisher .................. H04L 63/083
715/255

(Continued)

FOREIGN PATENT DOCUMENTS

JP          2020098484 A    6/2020
KR    1020100098028 A    9/2010

(Continued)

OTHER PUBLICATIONS

Oh et al., Temporal and Spatial Continuity Analysis of Issue Events, Journal of KIIT. Sep. 30, 2013, pp. 161-167, vol. 11, No. 9, English abstract.

*Primary Examiner* — Mahesh H Dwivedi
(74) *Attorney, Agent, or Firm* — ArentFox Schiff LLP; Yun Choe

(57) ABSTRACT

Provided are a system for recommending related data based on similarity, and a method thereof, the system including: a data collection device; an event extraction device; a data cleansing device; an event vector generation device; an artificial intelligence learning device; and a similar data recommendation device. The present disclosure is directed to providing a system for recommending related data based on similarity and a method thereof, wherein unstructured open data on a webpage is collected to automatically generate an event label for determining a similarity relation, and an artificial intelligence (AI)-based model is trained to group and recommend semantically similar related data, thereby effectively helping users including data scientists who want to see meaningful results through open data.

32 Claims, 7 Drawing Sheets

(51) Int. Cl.
    *G06F 16/35*     (2019.01)
    *G06F 16/383*     (2019.01)
    *G06F 40/30*     (2020.01)
    *G06Q 50/26*     (2012.01)

(56) References Cited

U.S. PATENT DOCUMENTS

| | | | | |
|---|---|---|---|---|
| 2005/0278362 | A1* | 12/2005 | Maren | G06F 16/906 |
| 2014/0082002 | A1* | 3/2014 | Kim | G06F 16/30 |
| | | | | 707/755 |
| 2019/0319980 | A1* | 10/2019 | Levy | G06N 5/048 |
| 2022/0014419 | A1* | 1/2022 | Tee | G06N 3/08 |

FOREIGN PATENT DOCUMENTS

| | | |
|---|---|---|
| KR | 1020180118979 A | 11/2018 |
| KR | 101937434 B1 | 1/2019 |
| KR | 1020190063978 A | 6/2019 |

\* cited by examiner

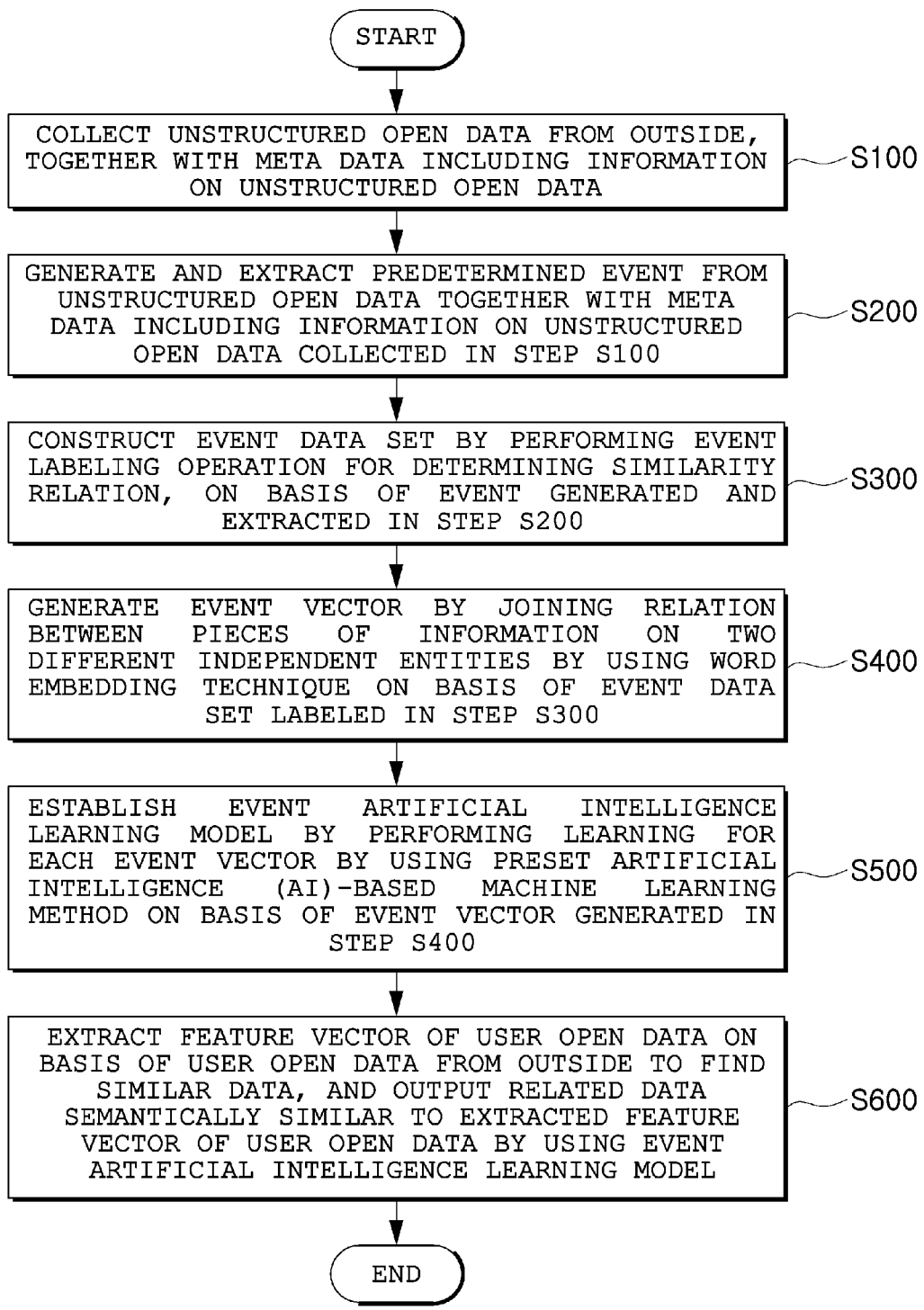

FIG. 4

```
<items>
  <item>
  <type>HIGHWAY</type>
  <eventTyp>WORK</evenType>
  <eventDetailType>WORK</eventDetailType>
  <startDate>20201127075753</startDate>
  <roadName>NAMHAE LINE (YEONGAM-SUNCHEON)</roadName>
  <roaNo>101</roadNo>
  <roadDrcType>DOWN</roadDrcType>
  <lanesBlockType/>
  <lanesBlocked>SECOND LANE BLOCKING</lanesBlocked>
  <message>(SECOND LANE)ROAD SURFACE REPAIR WORK IN PROGRESS</massage>
  <endDate/>
 </item>
</items>
```

FIG. 5

| output variable | value | Explanation |
|---|---|---|
| type | string | ROAD TYPE (HIGHWAY/NATIONAL ROAD/LOCAL ROAD/CITY AND DISTRICT ROADS/OTHERS) |
| eventType | string | EVENT TYPE (TRAFFIC ACCIDENT/CONSTRUCTION/WEATHER/DISASTER/OTHER EMERGENCIES/OTHERS) |
| eventDetailType | string | EVENT DETAIL TYPE |
| startDate | string | DATE AND TIME OF OCCURRENCE (YYYYMMDDHH24MISS) |
| roadName | string | ROAD NAME |
| roadNo | string | ROAD NUMBER |
| roadDrcType | string | ROAD DIRECTION TYPE |
| lanesBlockType | string | BLOCKING CONTROL TYPE |
| lanesBlocked | string | BLOCKING LANE |
| message | string | DETAILS OF EMERGENCY |
| endDate | string | END DATE AND TIME (YYYYMMDDHH24MISS) |

FIG. 6

```
"collect_data":[
    {
        "ROAD TYPE":"HIGHWAY",
        "EVENT TYPE":"WORK",
        "EVENT DETAIL TYPE":"WORK",
        "DATE AND TIME OF OCCURRENCE":"20201127075753",
        "ROAD NAME":"NAMHAE LINE (YEONGAM-SUNCHEON)",
        "ROAD DIRECTION TYPE":"DOWN",
        "BLOCKING CONTROL TYPE":"-",
        "BLOCKING LANE":"SECOND LANE BLOCKING",
        "DETAILS OF EMERGENCY":"(SECOND LANE) ROAD SURFACE REPAIR WORK IN PROGRESS"
        "END DATE AND TIME":"-"
    }
]
```

FIG. 7

```
[COLLECTED DATA]
     {
         "FIRE STATION":"ANSAN FIRE STATION",
         "DATE AND TIME":"09:38",
         "ADDRESS":"",
         "PROGRESS":"REMAINING FIRE MONITORING",
          "RESULT":"SITUATION END"
     }
[DATA WITH EVENT LABEL]
1. E(e1,r1,e2)
-E(ANSAN FIRE STATION, SITUATION END, REMAINING FIRE MONITORING)
2. E(e1,r1,e3)
-E(ANSAN FIRE STATION, SITUATION END, 09:38)
     • e1 :Actor(FIRE STATION) - >. Entity
     • r2 :Action(RESULT) - > Relation
     • e2 :Object(PROGRESS) - > Entity
     • e3 :Time(DATE AND TIME) - > Entity
```

SYSTEM FOR RECOMMENDING DATA BASED ON SIMILARITY AND METHOD THEREOF

CROSS REFERENCE TO RELATED APPLICATION

The present application claims priority to Korean Patent Application No. 10-2021-0103056, filed Aug. 5, 2021, the entire contents of which is incorporated herein for all purposes by this reference.

BACKGROUND OF THE INVENTION

Field of the Invention

The present disclosure relates to a system for recommending related data based on similarity, and a method thereof.

Description of the Related Art

In general, a government strives to prevent safety accidents occurring in daily life. The safety accidents may occur in various ways. Examples include disaster, health, transportation, environment, public security, industry, and facility accidents. In order to prevent safety accidents and respond promptly to accidents that have occurred, it is necessary to acquire accident-related information.

Today's well-developed information infrastructure is not limited to the infrastructure managed and owned by public institutions. Currently, through various types of crowd sourced data that can be obtained over the Internet and mobile devices, information on safety accidents can be quickly collected and data can be analyzed.

However, simply collecting data does not guarantee obtaining information accurately. For accurate classification and analysis, data should be processed in the correct format. Unprocessed data cannot be analyzed properly, and even if analyzed, it is not accurate. Data analysis of people's life safety should not be incomplete.

Therefore, in the process of collecting data, predetermined collection rules should be generated first. That is, data is collected according to the collection rules generated in advance.

However, there is a problem that updating and improving of the collection rules require a lot of human resources because the collection rules are generated by experts making small changes based on results of collected data and optimizing the collection rules. A considerable amount of labor and cost is bound to be spent.

In the meantime, the explosive growth of data today and an increase in the importance of creating new value through data utilization have gradually shifted society to a data-centric society.

Accordingly, as the demand for data sharing and linkage use has increased, the need for an open data platform capable of accessing and using data held by public institutions or private institutions has also increased.

Recently, the world's leading countries, such as the United Kingdom, the United States, etc., use open source-based data link platforms, such as 'CKAN' and 'Socrata', to support free data link environments through platforms between public institutions and private institutions.

However, open data provided on a web is provided by institutions using different sites, so it is difficult for a user to determine the relation even though semantically relevant content is involved.

The foregoing is intended merely to aid in the understanding of the background of the present disclosure, and is not intended to mean that the present disclosure falls within the purview of the related art that is already known to those skilled in the art.

DOCUMENT OF RELATED ART (Patent Document 1) Korean Patent Application Publication No. 10-2018-0118979 (published 1 Nov. 2018)

SUMMARY OF THE INVENTION

The present disclosure is directed to providing a system for recommending related data based on similarity and a method thereof, wherein unstructured open data on a webpage is collected to automatically generate an event label for determining a similarity relation, and an artificial intelligence (AI)-based model is trained to group and recommend semantically similar related data, thereby effectively helping users including data scientists who want to see meaningful results through open data.

According to a first aspect of the present disclosure, there is provided a system for recommending related data based on similarity, the system including: a data collection device configured to collect, from outside, unstructured open data together with meta data including information on the unstructured open data; an event extraction device configured to receive the unstructured open data together with the meta data including the information on the unstructured open data collected by the data collection device, and to generate and extract a predefined event from the open data and the meta data by using a pre-established event DB; a data cleansing device configured to construct an event data set by performing an event labeling operation for determining a similarity relation, on the basis of the event generated and extracted from the open data and the meta data by the event extraction device; an event vector generation device configured to receive the event data set labeled by the data cleansing device, and to generate, on the basis of the event data set, an event vector by joining a relation between pieces of information on two different independent entities by using a word embedding technique; an artificial intelligence learning device configured to receive the event vector generated by the event vector generation device, and to establish, on the basis of the event vector, an event artificial intelligence learning model by performing learning for each of a plurality of the event vectors through a preset artificial intelligence (AI)-based machine learning method; and a similar data recommendation device configured to receive, from outside, user open data to find similar data, to extract a feature vector of the user open data on the basis thereof, and to output the related data semantically similar to the extracted feature vector of the user open data by using the event artificial intelligence learning model established by the artificial intelligence learning device.

Herein, preferably, the data collection device is configured to collect the open data in JSON (JavaScript Object Notation) or XML (Extensible Markup Language) format having a specific key value and a semantic information value for the specific key value in a specific webpage.

Preferably, the data collection device is configured to convert a tag value corresponding to a specific key value in the unstructured open data and the meta data into a semantic word for collection.

Preferably, the unstructured open data collected by the data collection device includes at least one type of life safety data selected from a group of crowd-sourced data, life safety data stored for each pre-registered institution, and open data of a public institution.

Preferably, the predefined event in the event extraction device includes an actor performing an action, the action performed by the actor, an object of the action, and a time when the action is performed.

Preferably, the data collection device is configured to collect the unstructured open data and the meta data that have a specific key value and a semantic information value for the specific key value.

Preferably, the event extraction device is configured to receive the unstructured open data and the meta data that have the specific key value and the semantic information value for the specific key value collected by the data collection device, and to generate and extract the predefined event corresponding to the specific key value from the open data and the meta data by using the pre-established event DB.

Preferably, the event data set constructed by the data cleansing device is a combination of "the entity-the relation-the entity".

Preferably, the entity is a word corresponding to a subject or an object.

Preferably, the relation is a word corresponding to a verb.

Preferably, the event vector generation device is configured to receive the event data set labeled by the data cleansing device, to convert words into vectors on the basis of the event data set by using a Word2Vec model that is a technique for natural language processing, and to generate the event vector that is a sentence vector by joining the relation between the pieces of the information on the two different independent entities with a neural tensor network (NTN) model.

Preferably, the artificial intelligence learning device is configured to use similarity loss as an objective function to determine similarity between the event vectors, and to perform following operations: a weighting adjustment operation to reduce a loss rate that is a result value of the objective function, to measure performance of the event artificial intelligence learning model; and an operation to set a weighting for training of the event artificial intelligence learning model and to minimize a loss value, for accuracy of the event artificial intelligence learning model.

Preferably, the artificial intelligence (AI)-based machine learning method applied in the artificial intelligence learning device includes at least one artificial intelligence learning method selected from a group of a neural network, a support vector machine (SVM), a multilayer perceptron (MLP), and deep learning.

Preferably, the similar data recommendation device is configured to classify the related data semantically similar to the extracted feature vector of the user open data as at least one selected from a group of high similarity, partial similarity, and low similarity on the basis of a preset similarity score threshold value, and to output the related data.

Preferably, the system further includes a semi-supervised learning device configured to receive the unstructured open data together with the meta data including the information on the unstructured open data collected by the data collection device, to process the unstructured open data and the meta data by performing preprocessing of text normalization and morphological analysis, to generate, on the basis of the processed data, an event vector by joining the relation between the pieces of the information on the two different independent entities with a semi-supervised learning (SSL) method, and to enable the generated event vector to be used as training data of the event artificial intelligence learning model established by the artificial intelligence learning device.

Preferably, the system further includes a storage device configured to receive the user open data input from outside to find the similar data, together with the feature vector of the user open data and the related data semantically similar to the feature vector of the user open data extracted and recommended by the similar data recommendation device, and to use the user open data, the feature vector, and the related data to store the related data similar for each piece of the user open data in a database (DB).

Preferably, the system further includes a communication device configured to transmit the feature vector of the user open data extracted and recommended by the similar data recommendation device and the related data semantically similar to the feature vector of the user open data, to an external terminal or a server in a wired or wireless communication method.

Preferably, the external terminal or the server is configured to receive, through a pre-installed related data recommendation-associated application, the feature vector of the user open data and the related data semantically similar to the feature vector of the user open data transmitted from the communication device, and to use the feature vector and the related data to provide a service that the related data similar for each piece of the user open data is displayed on a display screen.

According to a second aspect of the present disclosure, there is provided a method of recommending related data based on similarity, the method including: (a) collecting, by a data collection device, unstructured open data from outside together with meta data including information on the unstructured open data; (b) generating and extracting, by an event extraction device, a predefined event from the unstructured open data together with the meta data including the information on the unstructured open data collected in the step (a); (c) constructing, by a data cleansing device, an event data set by performing an event labeling operation for determining a similarity relation, on the basis of the event generated and extracted in the step (b); (d) generating, by an event vector generation device on the basis of the event data set labeled in the step (c), an event vector by joining a relation between pieces of information on two different independent entities by using a word embedding technique; (e) performing, by an artificial intelligence learning device on the basis of the event vector generated in the step (d), learning for each of a plurality of the event vectors by using a preset artificial intelligence (AI)-based machine learning method and establishing an event artificial intelligence learning model; and (f) extracting, by a similar data recommendation device, a feature vector of user open data on the basis of the user open data from outside to find similar data, and outputting the related data semantically similar to the extracted feature vector of the user open data by using the event artificial intelligence learning model established in the step (e).

Herein, in the step (a), the data collection device may be configured to collect the open data in JSON (JavaScript Object Notation) or XML (Extensible Markup Language) format having a specific key value and a semantic information value for the specific key value in a specific webpage.

Preferably, in the step (a), the data collection device is configured to convert a tag value corresponding to a specific key value in the unstructured open data and the meta data into a semantic word for collection.

Preferably, in the step (a), the unstructured open data collected by the data collection device includes at least one type of life safety data selected from a group of crowd-sourced data, life safety data stored for each pre-registered institution, and open data of a public institution.

Preferably, in the step (b), the event extraction device is configured to generate and extract the predefined event from the open data and the meta data by using a pre-established event DB on the basis of the unstructured open data together with the meta data including the information on the unstructured open data collected in the step (a).

Preferably, in the step (b), the predefined event includes an actor performing an action, the action performed by the actor, an object of the action, and a time when the action is performed.

Preferably, in the step (a), the data collection device is configured to collect the unstructured open data and the meta data that have a specific key value and a semantic information value for the specific key value.

Preferably, in the step (b), the event extraction device is configured to generate and extract, on the basis of the unstructured open data and the meta data that have the specific key value and the semantic information value for the specific key value collected in the step (a), the predefined event corresponding to the specific key value from the open data and the meta data by using a pre-established event DB.

Preferably, in the step (c), the event data set constructed by the data cleansing device is a combination of "the entity-the relation-the entity".

Preferably, the entity is a word corresponding to a subject or an object, and the relation is a word corresponding to a verb.

Preferably, in the step (d), the event vector generation device is configured to convert words into vectors on the basis of the event data set labeled in the step (c) by using a Word2Vec model that is a technique for natural language processing, and to generate the event vector that is a sentence vector by joining the relation between the pieces of the information on the two different independent entities with a neural tensor network (NTN) model.

Preferably, in the step (e), the artificial intelligence learning device is configured to use similarity loss as an objective function to determine similarity between the event vectors, and to perform following operations: a weighting adjustment operation to reduce a loss rate that is a result value of the objective function, to measure performance of the event artificial intelligence learning model; and an operation to set a weighting for training of the event artificial intelligence learning model and to minimize a loss value, for accuracy of the event artificial intelligence learning model.

Preferably, in the step (e), the artificial intelligence (AI)-based machine learning method applied in the artificial intelligence learning device includes at least one artificial intelligence learning method selected from a group of a neural network, a support vector machine (SVM), a multi-layer perceptron (MLP), and deep learning.

Preferably, in the step (f), the similar data recommendation device is configured to classify the related data semantically similar to the extracted feature vector of the user open data as at least one selected from a group of high similarity, partial similarity, and low similarity on the basis of a preset similarity score threshold value, and to output the related data.

Preferably, the method further includes after the step (e), performing, by a semi-supervised learning device on the basis of the unstructured open data together with the meta data including the information on the unstructured open data collected in the step (a), preprocessing of text normalization and morphological analysis to process the open data and the meta data, generating, on the basis of the processed data, an event vector by joining the relation between the pieces of the information on the two different independent entities with a semi-supervised learning (SSL) method, and using the generated event vector as training data of the event artificial intelligence learning model established in the step (e).

Preferably, the method further includes after the step (f), using, by a storage device, the user open data input from outside to find the similar data, together with the feature vector of the user open data extracted and recommended in the step (f) and the related data semantically similar to the feature vector of the user open data, to store the related data similar for each piece of the user open data in a database (DB).

Preferably, the method further includes after the step (f), transmitting, by a communication device, the feature vector of the user open data extracted and recommended in the step (f) and the related data semantically similar to the feature vector of the user open data, to an external terminal or a server in a wired or wireless communication method.

Preferably, the external terminal or the server is configured to receive, through a pre-installed related data recommendation-associated application, the feature vector of the user open data and the related data semantically similar to the feature vector of the user open data transmitted from the communication device, and to use the feature vector and the related data to provide a service that the related data similar for each piece of the user open data is displayed on a display screen.

According to a third aspect of the present disclosure, there is provided a computer-readable recording medium having a program recorded thereon, the program enabling the method of recommending related data based on similarity to be executed.

The method of recommending related data based on similarity according to the present disclosure may be embodied as computer-readable code on the computer-readable recording medium. Examples of the computer-readable recording medium include all types of recording systems in which data readable by a computer system is stored.

Examples of the computer-readable recording medium include ROM, RAM, CD-ROM, a magnetic tape, a hard disk, a floppy disk, a removable storage system, non-volatile memory (flash memory), and an optical data storage system.

According to the system for recommending related data based on similarity and the method thereof according to the present disclosure, unstructured open data on a webpage is collected to automatically generate an event label for determining a similarity relation, and an artificial intelligence (AI)-based model is trained to group and recommend semantically similar related data, thereby effectively helping users including data scientists who want to see meaningful results through open data.

BRIEF DESCRIPTION OF THE DRAWINGS

The above and other objectives, features, and other advantages of the present disclosure will be more clearly understood from the following detailed description when taken in conjunction with the accompanying drawings, in which:

FIG. 3 is an overall flowchart illustrating a method of recommending related data based on similarity according to an embodiment of the present disclosure;

FIG. 4 is a diagram illustrating an example of open data in XML format collected by a data collection device applied to an embodiment of the present disclosure;

FIG. 5 is a diagram illustrating an example of meta data including information on unstructured open data collected by a data collection device applied to an embodiment of the present disclosure;

FIG. 6 is a diagram illustrating an example in which a tag value corresponding to a specific key value in unstructured open data and meta data is converted into a semantic word for collection by a data collection device applied to an embodiment of the present disclosure; and FIG. 7 is a diagram illustrating an example in which an event data set is constructed by a data cleansing device applied to an embodiment of the present disclosure.

DETAILED DESCRIPTION OF THE INVENTION

Figure 1:
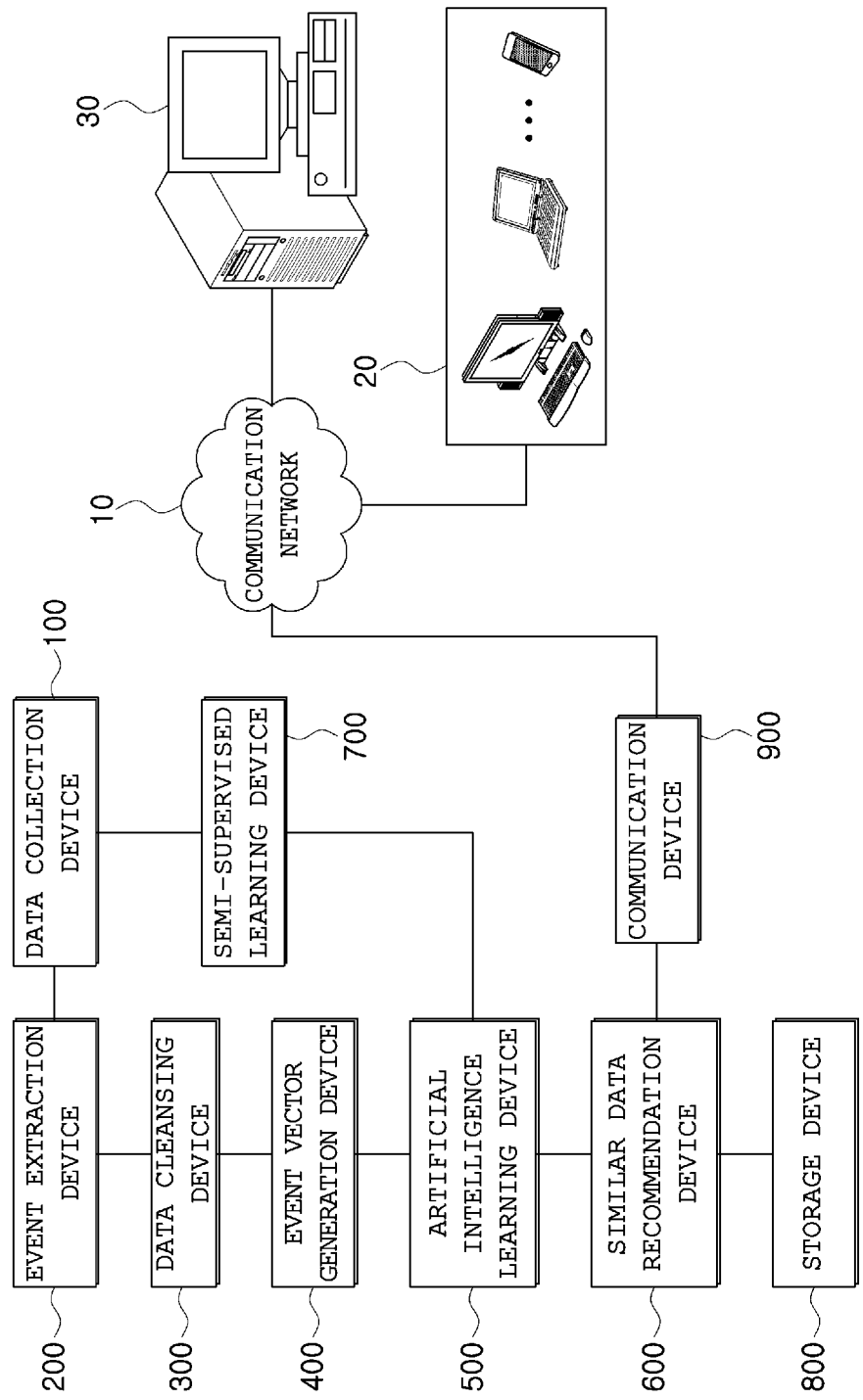
FIG. 1 is an overall block diagram illustrating a system for recommending related data based on similarity according to an embodiment of the present disclosure.

The above-described objects, features, and advantages will be described in detail with reference to the accompanying drawings. Accordingly, the technical scope of the present disclosure can be easily embodied by those skilled in the art to which the present disclosure belongs. Also, in describing the present disclosure, if it is decided that a detailed description of the known art related to the present disclosure makes the subject matter of the present disclosure unclear, the detailed description will be omitted.

Terms including ordinal numbers, such as "first", "second", etc. can be used to describe various elements, but the elements are not to be construed as being limited to the terms. The terms are only used to differentiate one element from other elements. For example, the "first" element may be named the "second" element without departing from the scope of the present disclosure, and the "second" element may also be similarly named the "first" element. The terms used in the present application are merely used to describe particular embodiments, and are not intended to limit the present disclosure. An expression used in the singular encompasses the expression of the plural, unless it has a clearly different meaning in the context.

All terms including descriptive or technical terms which are used herein should be construed as having meanings that are obvious to one of ordinary skill in the art. However, the terms may have different meanings according to an intention of one of ordinary skill in the art, precedent cases, or the appearance of new technologies. In addition, some terms may be arbitrarily selected by the applicant, and in this case, the meaning of the selected terms will be described in detail in the description of the disclosure. Thus, the terms used herein have to be defined based on the meaning of the terms together with the description throughout the specification.

Throughout the specification, when a part "includes" an element, it is noted that it further includes other elements, but does not exclude other elements, unless specifically stated otherwise. In addition, the terms "~part", "~device", and the like mean a unit for processing at least one function or operation and may be implemented by a combination of hardware and/or software.

Hereinafter, embodiments of the present disclosure will be described in detail with reference to the accompanying drawings. It should be understood that the embodiments of the present disclosure described below may be changed to a variety of embodiments and the scope of the present disclosure is not limited to the embodiments described below. The embodiments of the present disclosure are provided in order to fully describe the disclosure for those skilled in the art.

Combinations of blocks in the accompanying block diagrams or steps in the accompanying flowcharts may be executed by computer program instructions (execution engine), and the computer program instructions may be mounted in a processor of a general-use computer, special-use computer, or other programmable data processing equipment. Thus, the instructions executed through the processor of the computer or other programmable data processing equipment generate units for performing functions described in the respective blocks of the block diagrams or the respective steps of the flowcharts. The computer program instructions may be stored in a computer usable or readable memory oriented to a computer or other programmable data processing equipment, in order to implement functions in a specific method. Thus, the instructions stored in the computer usable or readable memory may be used to manufacture products including instruction units for performing the functions described in the respective blocks of the block diagrams or the respective steps of the flowcharts.

As described above, the computer program instructions may be mounted in the computer or other programmable data processing equipment. Therefore, instructions which generate computer-executed processes by performing a series of operation steps on the computer or other programmable data processing equipment and operate the computer or other programmable data processing equipment may provide steps for executing the functions described in the respective blocks of the block diagrams and the respective steps of the flowcharts.

Furthermore, each of the blocks or steps may indicate a part of a device, segment, or code including one ore more executable instructions for executing specific logical functions. In some substitutions, the functions described in the blocks or steps may be performed out of sequence. For example, two consecutively shown blocks or steps may be operated or performed substantially at the same time, and the blocks or steps may be operated or performed in the reverse order of the corresponding function.

Figure 2:
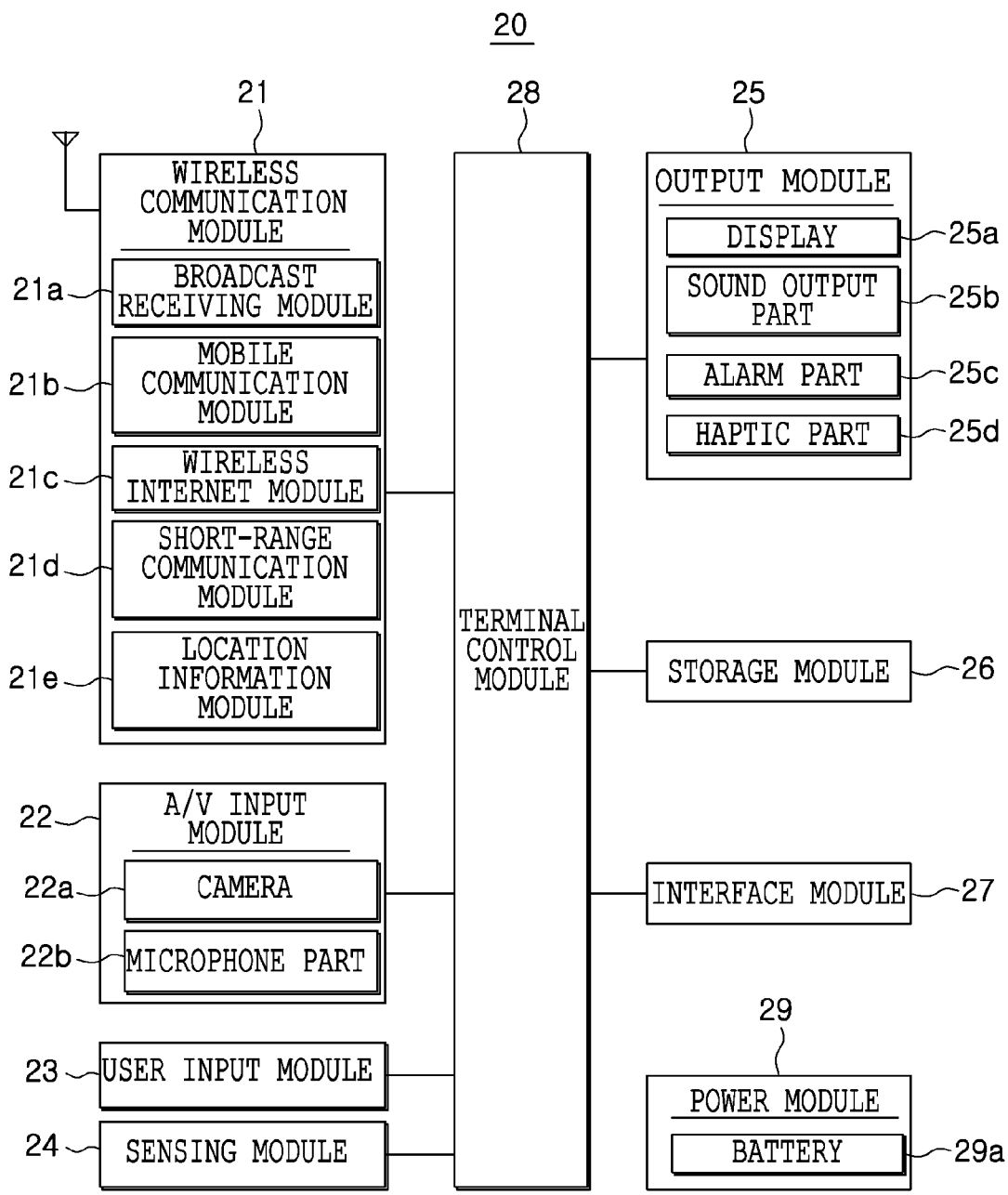
FIG. 2 is a block diagram illustrating an external terminal in detail applied to an embodiment of the present disclosure.

FIG. 1 is an overall block diagram illustrating a system for recommending related data based on similarity according to an embodiment of the present disclosure. FIG. 2 is a block diagram illustrating an external terminal in detail applied to an embodiment of the present disclosure.

Referring to FIGS. 1 and 2, a system for recommending related data based on similarity according to an embodiment of the present disclosure includes a data collection device 100, an event extraction device 200, a data cleansing device 300, an event vector generation device 400, an artificial intelligence learning device 500, and a similar data recommendation device 600. In addition, according to the embodiment of the present disclosure, the system for recommending related data based on similarity may further include a semi-supervised learning device 700, a storage device 800, a communication device 900, an external terminal 20, and/or a server 30. In the meantime, the elements shown in FIGS. 1 and 2 are not essential, so the system for recommending related data based on similarity according to an embodiment of the present disclosure may include more elements or fewer elements.

Hereinafter, the elements of the system for recommending related data based on similarity according to the embodiment of the present disclosure will be described in detail as follows.

The data collection device 100 performs a function of collecting, from outside, unstructured open data together with meta data including information on the unstructured open data.

Furthermore, the data collection device 100 may perform a function of collecting unstructured open data and meta data that have a specific key value and a semantic information value for the specific key value.

That is, the data collection device 100 may perform a function of collecting open data in JSON (JavaScript Object Notation) and/or XML (Extensible Markup Language) format having a specific key value and a semantic information value for the specific key value in a specific webpage.

Furthermore, the data collection device 100 may perform a function of converting a tag value corresponding to a specific key value in unstructured open data and meta data into a semantic word for collection from outside.

In the meantime, preferably, the unstructured open data collected by the data collection device 100 is at least one type of life safety data selected from the group of crowd-sourced data, life safety data stored for each pre-registered institution, and open data of a public institution, for example.

The event extraction device 200 performs a function of receiving the unstructured open data together with the meta data including the information on the unstructured open data collected by the data collection device 100, and of generating and extracting a predefined event from the open data and the meta data by using a pre-established event DB 250.

That is, the event extraction device 200 may perform a function of receiving the unstructured open data and the meta data having a specific key value and a semantic information value for the specific key value collected by the data collection device 100, and of generating and extracting a predefined event corresponding to the specific key value from the open data and the meta data by using the pre-established event DB 250.

Furthermore, preferably, the predefined event in the event extraction device 200 is at least one event selected from the group of Actor performing Action, Action performed by Actor, Object of Action, and Time when Action is performed, for example.

In the meantime, the event DB 250 performs a function of matching a specific key value to a predefined event corresponding thereto, and of storing the predefined events for the respective specific key values in the database (DB) for management.

The data cleansing device 300 performs a function of constructing an event data set by performing an event labeling operation for determining a similarity relation, on the basis of the event generated and extracted from the unstructured open data and meta data by the event extraction device 200.

Herein, preferably, the event data set constructed by the data cleansing device 300 is a combination of "entity-relation-entity", for example. Herein, preferably, the entity is a word corresponding to a subject and/or object and the relation is a word corresponding to a verb.

The event vector generation device 400 performs a function of receiving the event data set labeled by the data cleansing device 300, and of generating, on the basis of the event data set, an event vector by joining the relation between pieces of information on two different independent entities by using a word embedding technique.

In other words, the event vector generation device 400 may perform a function of receiving the event data set labeled by the data cleansing device 300, of converting words into vectors on the basis of the event data set by using a Word2Vec model, which is a technique for natural language processing, and of generating an event vector that is a sentence vector by joining the relation between pieces of information on two different independent entities with a neural tensor network (NTN) model.

The artificial intelligence learning device 500 performs a function of receiving the event vector generated by the event vector generation device 400 and of establishing, on the basis of the event vector, an event artificial intelligence learning model by performing learning for each event vector through a preset artificial intelligence (AI)-based machine learning method.

Furthermore, the artificial intelligence learning device 500 may use similarity loss as an objective function to determine similarity between event vectors, and may perform the following operations: a weighting adjustment operation to reduce a loss rate that is a result value of the objective function, to measure the performance of the event artificial intelligence learning model; and an operation to set a weighting for training of the event artificial intelligence learning model and to minimize a loss value, for the accuracy of the event artificial intelligence learning model.

Furthermore, preferably, the artificial intelligence (AI)-based machine learning method applied in the artificial intelligence learning device 500 is at least one artificial intelligence learning method selected from the group of a neural network, a support vector machine (SVM), a multi-layer perceptron (MLP), and deep learning, for example.

The similar data recommendation device 600 performs a function of receiving from outside user open data to find similar data, of extracting a feature vector of the user open data on the basis thereof, and of outputting related data semantically similar to the extracted feature vector of the user open data by using the event artificial intelligence learning model established by the artificial intelligence learning device 500.

Furthermore, the similar data recommendation device 600 may perform a function of classifying the related data semantically similar to the extracted feature vector of the user open data as at least one selected from the group of high similarity, partial similarity, and low similarity on the basis of a preset similarity score threshold value, and of outputting the related data.

In the meantime, although not shown in the drawings, a power supply (not shown) may be included. The power supply performs a function of supplying power required for the operation of each of the above-described devices, specifically, the data collection device 100, the event extraction device 200, the data cleansing device 300, the event vector generation device 400, the artificial intelligence learning device 500, the similar data recommendation device 600, the semi-supervised learning device 700, the storage device 800, and/or the communication device 900.

Preferably, the power supply is realized such that a commercial alternating current (AC) power (for example, AC 220 V or 380 V) is converted into a direct current (DC) and/or an alternating current (AC) power for continuous power supply. However, without being limited thereto, the power supply may be realized including a general portable battery.

Furthermore, the power supply may include a power management part (not shown) that performs a function of protecting components from external power shock, and of outputting constant voltage. The power management part may include an electrostatic damage (ESD) protector, a power detector, rectifier, and a power breaker.

Herein, the ESD protector is to protect electronic components from static electricity or sudden power shock. The power detector is to transmit a blocking signal to the power breaker when a voltage out of an allowable voltage range is introduced, and to transmit a step-up or step-down signal to the rectifier according to a voltage change within the allowable voltage range. The rectifier is to perform a step-up or step-down rectification operation according to the signal of the power detector so that a constant voltage is supplied by minimizing the fluctuation of the input voltage. The power breaker is to cut off the power supplied from a battery according to the blocking signal transmitted from the power detector.

The semi-supervised learning device 700 performs a function of receiving the unstructured open data together with the meta data including the information on the unstructured open data collected by the data collection device 100, of processing the unstructured open data and the meta data by performing preprocessing of text normalization and morphological analysis, of generating, on the basis of the processed data, an event vector by joining the relation between pieces of information on two different independent entities with a semi-supervised learning (SSL) method, and of enabling the generated event vector to be used as training data of the event artificial intelligence learning model established by the artificial intelligence learning device 500.

The storage device 800 performs a function of receiving the user open data input from outside to find similar data, together with the feature vector of the user open data and the related data semantically similar to the feature vector of the user open data that are extracted and recommended by the similar data recommendation device 600, and of using the received data to store the related data similar for each user open data in a database DB.

The storage device 800 may include at least one type of a storage medium selected from the group of flash memory, a hard disk, multimedia card micro type memory, card-type memory (e.g., SD or XD memory), random-access memory (RAM), static random-access memory (SRAM), read-only memory (ROM), electrically erasable programmable read-only memory (EEPROM), a programmable read-only memory (PROM), magnetic memory, a magnetic disk, and an optical disk, for example.

The communication device 900 performs a function of transmitting the feature vector of the user open data extracted and recommended by the similar data recommendation device 600 and the related data semantically similar to the feature vector of the user open data, to the external terminal 20 and/or the server 30 over a communication network 10 in a wired and/or wireless communication method.

Herein, the communication network 10 is a communication network that is a high-speed backbone network of a large-scale communication network capable of providing large-capacity and long-distance voice and data services. The communication network 10 may be a next-generation wireless communication network of which examples include Wi-Fi, WiGig, wireless broadband Internet (Wibro), and World Interoperability for Microwave Access (Wimax) for providing Internet or high-speed multimedia services.

The Internet means a worldwide open computer network structure that provides the TCP/IP protocol and various services existing in the upper layer thereof, for example, the Hyper Text Transfer Protocol (HTTP), Telnet, the File Transfer Protocol (FTP), the Domain Name System (DNS), the Simple Mail Transfer Protocol (SMTP), the Simple Network Management Protocol (SNMP), the Network File Service (NFS), the Network Information Service (NIS), etc. The Internet provides an environment that enables the communication device 900 to access the external terminal 20 and/or the server 30. In the meantime, the Internet may be a wired or wireless Internet, or may be a core network integrated with a wired public network, a wireless mobile communication network, or a mobile Internet.

In the case in which the communication network 10 is a mobile communication network, the communication network 10 may be a synchronous mobile communication network or an asynchronous mobile communication network. As an example of the asynchronous mobile communication network, there is a Wideband Code-Division Multiple Access (W-CDMA) communication network. In this case, although not shown in the drawings, the mobile communication network may include a radio network controller (RNC), for example. In the meantime, the WCDMA network is taken as an example, but the communication network may be a next-generation cellular-based communication network, such as a 3G network, an LTE network, a 4G network, and a 5G network, or other IP networks based on IP. The communication network 10 transmits signals and data between the communication device 900 and the external terminal 20, and/or the server 30.

The external terminal 20 and/or the server 30 perform a function of receiving, through a pre-installed related data recommendation-associated application, the feature vector of the user open data and the related data semantically similar to the feature vector of the user open data transmitted from the communication device 900, and of using the received data to provide a service that the related data similar for each user open data is displayed on a display screen.

In the meantime, preferably, the external terminal 20 is at least one mobile terminal system selected from the group of a smart phone, a smart pad, and a smart note performing communication over the wireless Internet or mobile Internet. In addition, the external terminal 20 may comprehensively mean all wired/wireless home appliances/communication systems, such as, a palm PC, a mobile game machine (mobile PlayStation), a digital multimedia broadcasting (DMB) phone with a communication function, a tablet PC, and an iPad, having a user interface for accessing the communication device 900.

The external terminal 20 may include, as shown in FIG. 2, a wireless communication module 21, an audio/video (A/V) input module 22, a user input module 23, a sensing module 24, an output module 25, a storage module 26, an interface module 27, a terminal control module 28, and a power supply module 29. In the meantime, the elements shown in FIG. 2 are not essential, so the external terminal 20 may include more elements or fewer elements.

Hereinafter, the elements of the external terminal 20 will be described in detail as follows.

The wireless communication module 21 may include one or more modules that enable wireless communication between the external terminal 20 and the communication device 900, and/or the server 30. For example, the wireless communication module 21 may include a broadcast reception module 21a, a mobile communication module 21b, a wireless Internet module 21c, a short-range communication module 21d, and a location information module 21e.

The broadcast reception module 21a receives broadcast signals (for example, TV broadcasting signals, radio broadcasting signals, and data broadcasting signals) and/or broadcast-related information from an external broadcast management server over various broadcast channels (for example, satellite channels, and terrestrial channels).

The mobile communication module 21b transmits and receives wireless signals to and from at least one selected from the group of a base station, the external terminal 20, and the server, over the mobile communication network. The wireless signals may include various types of data according to transmission and reception of a voice call signal, a video call signal, or a text/multimedia message.

The wireless Internet module 21c is a module for wireless Internet access, and may be built in the external terminal 20 or provided as an external module. As a technology for the wireless Internet, WLAN (Wi-Fi), Wibro, Wimax, HSDPA, or LTE may be used, for example.

The short-range communication module 21d is a module for short-range communication. For example, Bluetooth communication, ZigBee communication, ultra-wideband (UWB) communication, radio-frequency identification (RFID) communication, or infrared (IR) communication may be used.

The location information module 21e is a module for determining or obtaining the location of the external terminal 20. Current location information of the external terminal 20 may be obtained using the Global Position System (GPS).

In the meantime, under the control of the terminal control module 28, data is transmitted to and received from the server 30 and/or the communication device 900 through the wireless communication module 21 and/or a wired communication module (not shown) by using a specific application program stored in the storage module 26.

The A/V input module 22 is a module for inputting audio signals or video signals, and may fundamentally include a camera part 22a and a microphone part 22b. The camera part 22a processes image frames, such as still images or videos, obtained by an image sensor in a video call mode or a shooting mode. The microphone part 22b receives an external sound signal via a microphone in a call mode, a recording mode, or a voice recognition mode, and processes the external sound signal into electrical voice data.

The user input module 23 is a module for generating input data for controlling the operation of the external terminal 20. In particular, the user input module 23 performs a function of inputting a selection signal for any one of the pieces of data management information displayed on a display part 25a of the output module 25. For example, the selection signal may be input using a touch panel (resistive/capacitive) format in which an input is provided by a user's touch, or a separate input device (for example, a keypad dome switch, a jog wheel, a jog switch, etc.).

The sensing module 24 detects the current state of the external terminal 20, for example, the open/close state of the external terminal 20, the location of the external terminal 20, a user's contact or non-contact, a user's touch action for a specific area, the azimuth of the external terminal 20, the acceleration/deceleration of the external terminal 20, etc. The sensing module 24 generates a sensing signal for controlling the operation of the external terminal 20. The sensing signal is transmitted to the terminal control module 28, and may become a basis for the terminal control module 28 to perform a specific function.

The output module 25 is a module for generating output related to visual, auditory, tactile senses, etc., and may fundamentally include a display part 25a, a sound output part 25b, an alarm part 25c, and a haptic part 25d.

The display part 25a is for displaying and outputting information processed by the external terminal 20. For example, when the external terminal 20 is in the call mode, the display part 25a displays a user interface (UI) or graphical user interface (GUI) related to a call. When the external terminal 20 is in the video call mode or the shooting mode, the display part 25a displays a captured and/or received image, a UI, or a GUI.

The sound output part 25b may output audio data received from the wireless communication module 21 or stored in the storage module 26 in reception of a call signal, the call mode, the recording mode, the voice recognition mode, or a broadcast reception mode, for example. The alarm part 25c may output a signal for notifying of the occurrence of an event of the external terminal 20. Examples of the event occurring in the external terminal 20 include the reception of a call signal, the reception of a message, the input of a key signal, and the input of a touch.

The haptic part 25d generates various tactile effects that the user feels. A representative example of the tactile effects generated by the haptic part 25d is vibration. The intensity and pattern of vibration generated by the haptic part 25d are controllable.

The storage module 26 may store therein a program for the operation of the terminal control module 28, and may temporarily store therein input/output data (for example, phone books, messages, still images, and videos).

Furthermore, the storage module 26 may store therein data related to vibrations and sounds of various patterns output when a touch on a touchscreen is input, and may store therein a related data recommendation-associated application program.

Furthermore, the storage module 26 may store therein source data for forming related data recommendation-associated information. Related data recommendation-associated data may be in the form of images and sounds, and a process and a result of generating the related data recommendation-associated data may also be stored together.

The storage module 26 may include at least one type of a storage medium selected from the group of flash memory, a hard disk, multimedia card micro type memory, card-type memory (e.g., SD or XD memory), RAM, SRAM, ROM, EEPROM, PROM, magnetic memory, a magnetic disk, and an optical disk.

The interface module 27 serves as a passage to all the external devices connected to the external terminal 20. The interface module 27 receives data from an external device or power to transmit the data or power to each element inside the external terminal 20, or transmits data inside the external terminal 20 to an external device.

The terminal control module 28 is to generally control the overall operation of the external terminal 20. For example, the terminal control module 28 performs control and processing for voice calls, data communication, video calls, and execution of various applications.

That is, the terminal control module 28 performs a function of performing control such that the related data recommendation-associated application program stored in the storage module 26 is executed, the generation of related data recommendation-associated data is requested through the execution of the related data recommendation-associated application program, and the related data recommendation-associated data is received.

Furthermore, the terminal control module 28 performs a function of performing control such that in the process of generating the related data recommendation-associated data that the user wants through the execution of the related data recommendation-associated application program, auxiliary elements including at least one selected from the group of an image, a voice, and a sound are output through at least one selected from the group of the display part 25a and other output devices (for example, the sound output part 25b, the alarm part 25c, and the haptic part 25d).

Furthermore, the terminal control module 28 may constantly monitor a charging current and a charging voltage of a battery part 29a, and may temporarily store the monitoring values in the storage module 26. Herein, preferably, the storage module 26 may store therein battery state-of-charge information, such as the monitored charging current and charging voltage, as well as battery specification information (a product code, and a rating).

The power supply module 29 receives external power and internal power under the control of the terminal control module 28, and supplies power required for the operation of each of the elements. The power supply module 29 supplies the power of the battery part 29a built therein to each of the elements to operate. The battery is charged using a charging terminal (not shown).

The various embodiments described herein may be realized in a recording medium readable by a computer or a similar device by using software, hardware, or any combination thereof, for example.

For the hardware implementation, the embodiments described herein may be implemented by using at least one selected from the group of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and an electrical unit for performing a function. In some cases, such embodiments may be realized by the terminal control module 28.

For the software implementation, the embodiments such as procedures or functions may be realized with a separate software module for performing at least one function or operation. Software codes may be realized by a software application written in a suitable programming language. Furthermore, the software codes may be stored in the storage module 26, and may be executed by the terminal control module 28.

If the external terminal 20 is a smartphone, unlike a general mobile phone (also known as a feature phone), the smartphone is a phone based on an open operating system that allows a user to download various application programs that the user wants and to freely use and delete the application programs. Accordingly, the smartphone is preferably understood as communication devices that include all mobile phones having mobile office functions and generally used functions, such as a voice/video call, and Internet data communication, or includes all Internet phones or tablet PCs having no voice call function but being accessible to the Internet.

Since the smartphone uses an open operating system, a user is allowed to install and manage any various application programs, unlike a mobile phone having a closed operating system.

Hereinafter, a method of recommending related data based on similarity according to an embodiment of the present disclosure will be described in detail.

FIG. 3 is an overall flowchart illustrating a method of recommending related data based on similarity according to an embodiment of the present disclosure. FIG. 4 is a diagram illustrating an example of open data in XML format collected by a data collection device applied to an embodiment of the present disclosure. FIG. 5 is a diagram illustrating an example of meta data including information on unstructured open data collected by a data collection device applied to an embodiment of the present disclosure. FIG. 6 is a diagram illustrating an example in which a tag value corresponding to a specific key value in unstructured open data and meta data is converted into a semantic word for collection by a data collection device applied to an embodiment of the present disclosure. FIG. 7 is a diagram illustrating an example in which an event data set is constructed by a data cleansing device applied to an embodiment of the present disclosure.

Referring to FIGS. 1 to 7, in a method of recommending related data based on similarity according to an embodiment of the present disclosure, first, the data collection device 100 collects, from outside, unstructured open data together with meta data including information on the unstructured open data in step S100.

Herein, in step S100, the data collection device 100 may collect unstructured open data and meta data that have a specific key value and a semantic information value for the specific key value (see FIGS. 4 and 5).

For example, the data collection device 100 may collect open data in JSON (JavaScript Object Notation) and/or XML (Extensible Markup Language) format having a specific key value and a semantic information value for the specific key value in a specific webpage (see FIG. 4).

Furthermore, the data collection device 100 may convert a tag value corresponding to a specific key value in unstructured open data and meta data into a semantic word for collection (see FIG. 6).

In the meantime, in the case in which open data in JSON (JavaScript Object Notation) and/or XML (Extensible Markup Language) format and meta data are not provided, but data is provided in the format of posting on a specific webpage, the data collection device 100 may collect a part corresponding to a column of a data collector table as a key value.

In the meantime, in step S100, preferably, the unstructured open data collected by the data collection device 100 is at least one type of life safety data selected from the group of crowd-sourced data, life safety data stored for each pre-registered institution, and open data of a public institution, for example.

Afterward, the event extraction device 200 generates and extracts a predefined event in step S200 from the unstructured open data together with the meta data including the information on the unstructured open data collected in step S100.

That is, in step S200, on the basis of the unstructured open data together with the meta data including the information on the unstructured open data collected in step S100, the event extraction device 200 may generate and extract a predefined event from the open data and the meta data by using the pre-established event DB 250.

For example, in order to find an associative relation between the unstructured open data and the meta data that have a specific key value and a semantic information value for the specific key value collected in step S100, an event is generated from the specific key value, so the event extraction device 200 may generate and extract a predefined event corresponding to the specific key value from the open data and the meta data by using the pre-established event DB 250, on the basis of the unstructured open data and the meta data having a specific key value and a semantic information value for the specific key value collected in step S100.

Herein, preferably, the predefined event is at least one event selected from the group of Actor performing Action, Action performed by Actor, Object of Action, and Time when Action is performed, for example.

In the meantime, in the data collected in step S100, if a specific key value is not present in the event DB 250, an entity name recognition model using an artificial neural network may be added for the operation of recognizing the entity name of the specific key.

Next, the data cleansing device 300 constructs an event data set in step S300 by performing an event labeling operation for determining a similarity relation, on the basis of the event generated and extracted in step S200.

That is, generating an event label from a series of data through the data cleansing device 300 is to find an associative relation by giving subject, object, and/or predicate relations to the data composed of the specific key value and the semantic information value for the specific key value in a pair.

Herein, preferably, the event data set constructed by the data cleansing device 300 is a combination of "entity-relation-entity", for example. Regarding the event data set expressed as "entity-relation-entity", a plurality of event data sets may be expressed by combining collected specific key values.

Herein, preferably, the entity is a word corresponding to a subject and/or object and the relation is a word corresponding to a verb.

For example, finding an event for a specific key value from the unstructured open data collected in step S100, matching to events such as Actor (fire station), Action (result), Object (progress), and Time (date and time) takes place, and from the event-matched data, structural features of a sentence such as a subject, object, and verb, that is, an event data set, are generated (see FIG. 7).

In the meantime, the main feature of the present disclosure is based on the fact that open data having event vector values within similar ranges have an associative relation based on the distributional hypothesis. For example, the open data that occur at the same time and have the same Actor and the same Object have semantically similar vector values.

Next, the event vector generation device 400 generates an event vector in step S400 by joining the relation between pieces of information on two different independent entities by using a word embedding technique on the basis of the event data set labeled in step S300.

In other words, in step S400, the event vector generation device 400 may convert the words into vectors (for example, e1(Ansan fire station), r1(situation end), e3(remaining fire monitoring)→e1(1,0,0,0), r1(0,1,1,0), e3(0,1,0,0)) by using a Word2Vec model, which is a technique for natural language processing on the basis of the event data set labeled in step S300, and may generate an event vector (for example, e1(1,0,0,0), r1(0,1,1,0), e3(0,1,0,0)→Sentence(0, 1, 0, 0)) that is a sentence vector, by joining the relation between pieces of information on two different independent entities with a neural tensor network (NTN) model.

Afterward, the artificial intelligence learning device 500 performs, on the basis of the event vector generated in step S400, learning for each event vector by using a preset artificial intelligence (AI)-based machine learning method and establishes an event artificial intelligence learning model in step S500.

Herein, the artificial intelligence learning device 500 may use similarity loss (e.g., contrastive Loss, triplet Loss, and margin Loss) as an objective function to determine similarity between event vectors, and may perform the following operations: a weighting adjustment operation to reduce a loss rate that is a result value of the objective function, to measure the performance of the event artificial intelligence learning model; and an operation to set a weighting for training of the event artificial intelligence learning model and to minimize a loss value, for the accuracy of the event artificial intelligence learning model.

In the meantime, preferably, the artificial intelligence (AI)-based machine learning method applied in the artificial intelligence learning device 500 is at least one artificial intelligence learning method selected from the group of a neural network, a support vector machine (SVM), a multi-layer perceptron (MLP), and deep learning, for example.

Next, the similar data recommendation device 600 extracts, on the basis of user open data from outside to find similar data, a feature vector of the user open data, and output related data semantically similar to the extracted feature vector of the user open data in step S600 by using the event artificial intelligence learning model established in step S500.

Herein, the similar data recommendation device 600 classifies the related data semantically similar to the extracted feature vector of the user open data as at least one selected from the group of high similarity, partial similarity, and low similarity on the basis of a preset similarity score threshold value, and outputs the related data.

That is, a result of grouping semantically similar data is provided to the user, so it is helpful for users including data scientists who want to see meaningful results through open data.

Furthermore, although not shown in the drawings, after step S500, the method of recommending related data based on similarity may further include performing, by the semi-supervised learning device 700 on the basis of the unstructured open data together with the meta data including the information on the unstructured open data collected in step S100, preprocessing of text normalization and morphological analysis to process the unstructured open data and the meta data, and generating, on the basis of the processed data, an event vector by joining the relation between pieces of information on two different independent entities with a semi-supervised learning (SSL) method, and using the generated event vector as training data of the event artificial intelligence learning model established in step S500.

Herein, the semi-supervised learning (SSL) method is a learning method with an intermediate characteristic between supervised learning and unsupervised learning, and is a technique for improving the performance of a model by using both a data set with label information and a data set without label information. That is, a pattern is extracted using the minimum labeled training data, and a label is generated through a bootstrapping or ensemble programming operation on a large amount of training data.

This semi-supervised learning technique is widely used to improve the performance of a target model in a domain (e.g., a medical domain) where it is difficult to obtain data samples with labels or a labeling operation is costly.

Furthermore, although not shown in the drawings, after step S600, the method of recommending related data based on similarity may further include using, by the storage device 800, the user open data input from outside to find similar data, together with the feature vector of the user open data extracted and recommended in step S600 and the related data semantically similar to the feature vector of the user open data to store the related data similar for each user open data in a database (DB).

In addition, after step S600, the method of recommending related data based on similarity may further include transmitting, by the communication device 900, the feature vector of the user open data extracted and recommended in step S600 and the related data semantically similar to the feature vector of the user open data, to the external terminal and/or the server 950 in a wired and/or wireless communication method.

Herein, the external terminal 20 and/or the server 30 may receive, through a pre-installed related data recommendation-associated application, the feature vector of the user open data and the related data semantically similar to the feature vector of the user open data transmitted from the communication device 900, and may use the received data to provide a service that the related data similar for each user open data is displayed on a display screen.

In the meantime, the above-described additional steps after step S600 may be performed sequentially or randomly as needed, or may be performed in changed order.

In the meantime, the method of recommending related data based on similarity according to an embodiment of the present disclosure may be embodied as computer-readable code on a computer-readable recording medium. Examples of the computer-readable recording medium include all types of recording systems in which data readable by a computer system is stored.

Examples of the computer-readable recording medium include ROM, RAM, CD-ROM, a magnetic tape, a hard disk, a floppy disk, a removable storage system, non-volatile memory (flash memory), and an optical data storage system.

In addition, the computer-readable recording medium is distributed to computer systems connected over a computer communication network, and may be stored and executed as code readable in a distributed manner.

Although a system for recommending related data based on similarity and a method thereof according to the preferred embodiments of the present disclosure have been described, the present disclosure is not limited thereto. Various modifications may be made within the scope of claims, detailed description, and accompanying drawings, and the modifications may fall within the scope of the present disclosure.

What is claimed is:

1. A system for recommending related data based on similarity, the system comprising:
processor operably coupled to a memory comprising computer-readable instructions, wherein the processor is configured:
to collect unstructured open data together with meta data including information on the unstructured open data;
to receive the unstructured open data together with the meta data including the information on the unstructured open, and to generate and extract a predefined event from the open data and the meta data by using a pre-established event DB;
to construct an event data set by performing an event labeling operation for determining a similarity relation, on the basis of the event generated and extracted from the open data and the meta data;
to receive the event data set, on the basis of the event data set, an event vector by joining a relation between pieces of information on two different independent entities by using a word embedding technique;
to receive the event vector, and to establish, on the basis of the event vector, an event artificial intelligence learning model by performing learning for each of a plurality of the event vectors through a preset artificial intelligence (AI)-based machine learning method; and
to receive user open data to find similar data by extracting a feature vector of the user open data on the basis thereof, and to output the related data semantically similar to the extracted feature vector of the user open data using the event artificial intelligence learning model.

2. The system of claim 1, wherein the processor is configured to collect the open data in JavaScript Object Notation (JSON) or Extensible Markup Language (XML) format having a specific key value and a semantic information value for the specific key value in a specific webpage.

3. The system of claim 1, wherein the processor is configured to convert a tag value corresponding to a specific key value in the unstructured open data and the meta data into a semantic word for collection.

4. The system of claim 1, wherein the unstructured open data includes at least one type of life safety data selected from a group of crowd-sourced data, life safety data stored for each pre-registered institution, and open data of a public institution.

5. The system of claim 1, wherein the predefined event includes an actor performing an action, the action performed by the actor, an object of the action, and a time when the action is performed.

6. The system of claim 1, wherein the data processor is configured to collect the unstructured open data and the meta data that have a specific key value and a semantic information value for the specific key value, and
to receive the unstructured open data and the meta data that have the specific key value and the semantic information value for the specific key value collected to generate and extract the predefined event corresponding to the specific key value from the open data and the meta data by using the pre-established event DB.

7. The system of claim 1, wherein the event data set constructed is a combination of the entity, the relation, and the entity, and
the entity is a word corresponding to a subject or an object, and the relation is a word corresponding to a verb.

8. The system of claim 1, wherein the processor is configured to receive the event data set, to convert words into vectors on the basis of the event data set by using a Word2Vec model that is a technique for natural language processing, and to generate the event vector that is a sentence vector by joining the relation between the pieces of the information on the two different independent entities with a neural tensor network (NTN) model.

9. The system of claim 1, wherein the processor is configured to use similarity loss as an objective function to determine similarity between the event vectors, and to perform following operations: a weighting adjustment operation to reduce a loss rate that is a result value of the objective function, to measure performance of the event artificial intelligence learning model; and an operation to set a weighting for training of the event artificial intelligence learning model and to minimize a loss value, for accuracy of the event artificial intelligence learning model.

10. The system of claim 1, wherein the artificial intelligence (AI)-based machine learning method includes at least one artificial intelligence learning method selected from a group of a neural network, a support vector machine (SVM), a multilayer perceptron (MLP), and deep learning.

11. The system of claim 1, wherein the processor is configured to classify the related data semantically similar to the extracted feature vector of the user open data as at least one selected from a group of high similarity, partial similarity, and low similarity on the basis of a preset similarity score threshold value, and to output the related data.

12. The system of claim 1, wherein the processor is further configured
to receive the unstructured open data together with the meta data including the information on the unstructured open data,
to process the unstructured open data and the meta data by performing preprocessing of text normalization and morphological analysis,
to generate, on the basis of the processed data, an event vector by joining the relation between the pieces of the information on the two different independent entities with a semi-supervised learning (SSL) method, and
to enable the generated event vector to be used as training data of the event artificial intelligence learning model.

13. The system of claim 1, wherein the processor is further configured
to receive the user open data input from outside to find the similar data, together with the feature vector of the user open data and the related data semantically similar to the feature vector of the user open data, and
to use the user open data, the feature vector, and the related data to store the related data similar for each piece of the user open data in a database (DB).

14. The system of claim 1, wherein the processor is further configured to transmit the feature vector of the user open data and the related data semantically similar to the feature vector of the user open data, to an external terminal or a server in a wired or wireless communication method.

15. The system of claim 14, wherein the external terminal or the server is configured
to receive, through a pre-installed related data recommendation-associated application, the feature vector of the user open data and the related data semantically similar to the feature vector of the user open data, and
to use the feature vector and the related data to provide a service that the related data similar for each piece of the user open data is displayed on a display screen.

16. A method of recommending related data based on similarity, the method comprising:
(a) collecting, by a data collection device, unstructured open data from outside together with meta data including information on the unstructured open data;
(b) generating and extracting, by an event extraction device, a predefined event from the unstructured open data together with the meta data including the information on the unstructured open data collected in the step (a);
(c) constructing, by a data cleansing device, an event data set by performing an event labeling operation for determining a similarity relation, on the basis of the event generated and extracted in the step (b);
(d) generating, by an event vector generation device on the basis of the event data set labeled in the step (c), an event vector by joining a relation between pieces of information on two different independent entities by using a word embedding technique;
(e) performing, by an artificial intelligence learning device on the basis of the event vector generated in the step (d), learning for each of a plurality of the event vectors by using a preset artificial intelligence (AI)-based machine learning method and establishing an event artificial intelligence learning model; and
(f) extracting, by a similar data recommendation device, a feature vector of user open data on the basis of the user open data from outside to find similar data, and outputting the related data semantically similar to the extracted feature vector of the user open data by using the event artificial intelligence learning model established in the step (e).

17. The method of claim 16, wherein in the step (a), the data collection device is configured to collect the open data in JSON (JavaScript Object Notation) or XML (Extensible Markup Language) format having a specific key value and a semantic information value for the specific key value in a specific webpage.

18. The method of claim 16, wherein in the step (a), the data collection device is configured to convert a tag value corresponding to a specific key value in the unstructured open data and the meta data into a semantic word for collection.

19. The method of claim 16, wherein in the step (a), the unstructured open data collected by the data collection device includes at least one type of life safety data selected from a group of crowd-sourced data, life safety data stored for each pre-registered institution, and open data of a public institution.

20. The method of claim 16, wherein in the step (b), the event extraction device is configured to generate and extract the predefined event from the open data and the meta data by using a pre-established event DB on the basis of the unstructured open data together with the meta data including the information on the unstructured open data collected in the step (a).

21. The method of claim 16, wherein in the step (b), the predefined event includes an actor performing an action, the action performed by the actor, an object of the action, and a time when the action is performed.

22. The method of claim 16, wherein in the step (a), the data collection device is configured to collect the unstructured open data and the meta data that have a specific key value and a semantic information value for the specific key value, and
in the step (b), the event extraction device is configured to generate and extract, on the basis of the unstructured open data and the meta data that have the specific key value and the semantic information value for the specific key value collected in the step (a), the predefined event corresponding to the specific key value from the open data and the meta data by using a pre-established event DB.

23. The method of claim 16, wherein in the step (c), the event data set constructed by the data cleansing device is a combination of "the entity-the relation-the entity", and
the entity is a word corresponding to a subject or an object, and the relation is a word corresponding to a verb.

24. The method of claim 16, wherein in the step (d), the event vector generation device is configured to convert words into vectors on the basis of the event data set labeled in the step (c) by using a Word2Vec model that is a technique for natural language processing, and to generate the event vector that is a sentence vector by joining the relation between the pieces of the information on the two different independent entities with a neural tensor network (NTN) model.

25. The method of claim 16, wherein in the step (e), the artificial intelligence learning device is configured to use similarity loss as an objective function to determine similarity between the event vectors, and to perform following operations: a weighting adjustment operation to reduce a loss rate that is a result value of the objective function, to measure performance of the event artificial intelligence learning model; and an operation to set a weighting for training of the event artificial intelligence learning model and to minimize a loss value, for accuracy of the event artificial intelligence learning model.

26. The method of claim 16, wherein in the step (e), the artificial intelligence (AI)-based machine learning method applied in the artificial intelligence learning device includes at least one artificial intelligence learning method selected from a group of a neural network, a support vector machine (SVM), a multilayer perceptron (MLP), and deep learning.

27. The method of claim 16, wherein in the step (f), the similar data recommendation device is configured to classify the related data semantically similar to the extracted feature vector of the user open data as at least one selected from a group of high similarity, partial similarity, and low similarity on the basis of a preset similarity score threshold value, and to output the related data.

28. The method of claim 16, further comprising after the step (e),
performing, by a semi-supervised learning device on the basis of the unstructured open data together with the meta data including the information on the unstructured open data collected in the step (a),
preprocessing of text normalization and morphological analysis to process the open data and the meta data,
generating, on the basis of the processed data, an event vector by joining the relation between the pieces of the information on the two different independent entities with a semi-supervised learning (SSL) method, and
using the generated event vector as training data of the event artificial intelligence learning model established in the step (e).

29. The method of claim 16, further comprising after the step (f), using, by a storage device, the user open data input from outside to find the similar data, together with the feature vector of the user open data extracted and recommended in the step (f) and the related data semantically similar to the feature vector of the user open data, to store the related data similar for each piece of the user open data in a database (DB).

30. The method of claim 16, further comprising after the step (f), transmitting, by a communication device, the feature vector of the user open data extracted and recommended in the step (f) and the related data semantically similar to the feature vector of the user open data, to an external terminal or a server in a wired or wireless communication method.

31. The method of claim 30, wherein the external terminal or the server is configured
to receive, through a pre-installed related data recommendation-associated application, the feature vector of the user open data and the related data semantically similar to the feature vector of the user open data transmitted from the communication device, and
to use the feature vector and the related data to provide a service that the related data similar for each piece of the user open data is displayed on a display screen.

32. A non-transitory computer-readable recording medium having a program recorded thereon, the program enabling a method of recommending related data based on similarity, to be executed by a computer comprising:
(a) collecting, by a data collection device, unstructured open data from outside together with meta data including information on the unstructured open data;
generating and extracting by event extraction device, a predefined event from the unstructured open data together with the ta da a including the information on the unstructured open data collected if the step (a),
(c) constructing, by a data cleansing device, an event data set by performing an event labeling operation for determining a similarity relation, on the basis of the vent generated and extracted in the step (b);
(d) generating by an event vector generation device on the basis of the event data set labeled in step (c), an event vector by joining a relation between pieces of information on two different independent entities by using a word embedding technique;
(e) performing, by an artificial intelligence learning device on the basis of the event vector generated in the step (d), learning for each of a plurality of the event vectors by using a preset artificial intelligence (AI)-based machine learning method and establishing an event artificial intelligence learning model; and
(f) extracting, by a similar data recommendation device, a feature vector of user open data on the basis of the user open data from outside to find similar data, and outputting the related data semantically similar to the extras ted are vector of the user open data by using the event artificial intelligence learning model established in the step (e).

* * * * *